May 16, 1939.  A. R. PRIBIL  2,158,488
INDEPENDENTLY SPRUNG SUSPENSION WHEEL UNIT
Filed Sept. 19, 1936  2 Sheets-Sheet 2
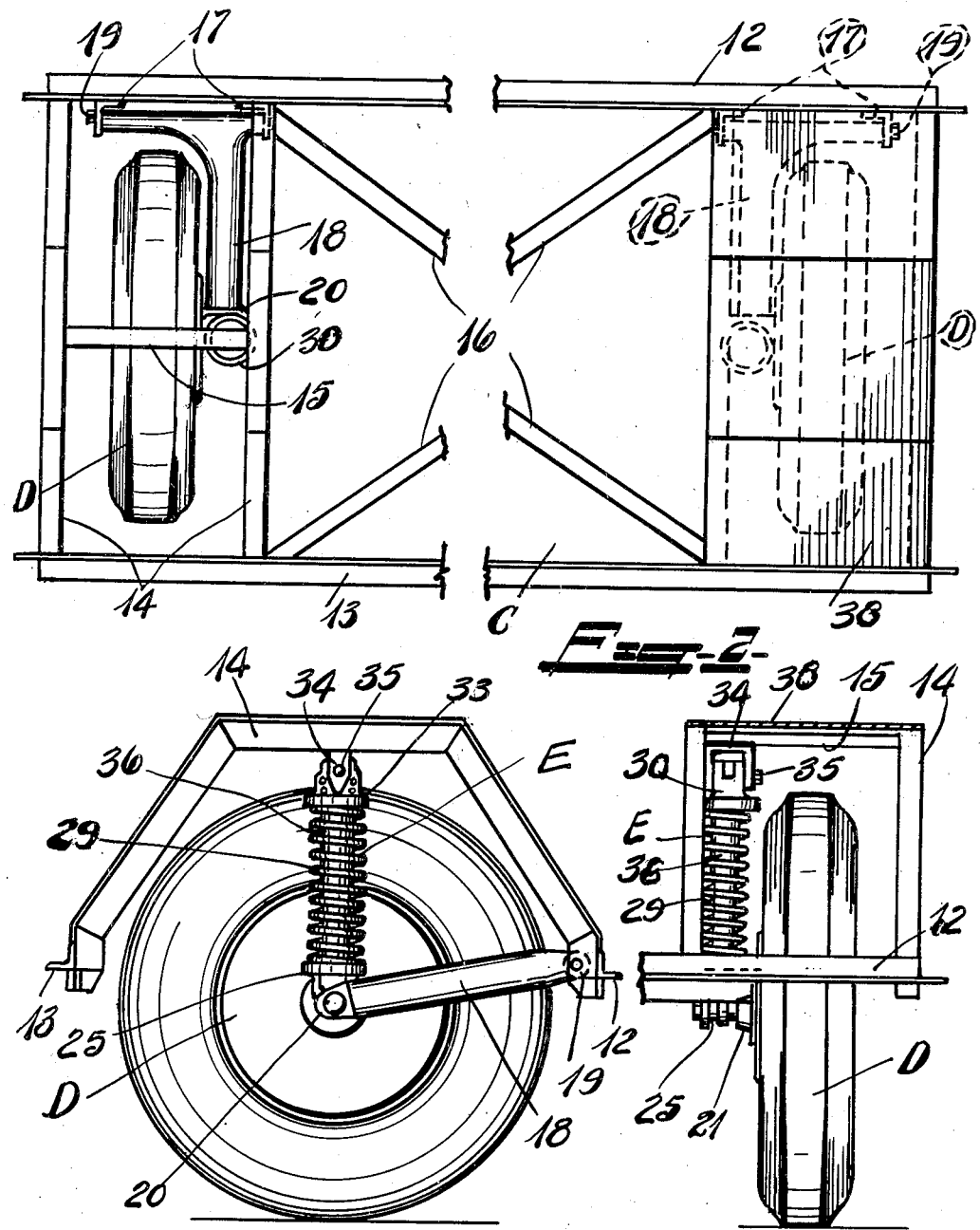
INVENTOR.
Alexis R. Pribil
BY Frank C. Karman
ATTORNEYS.

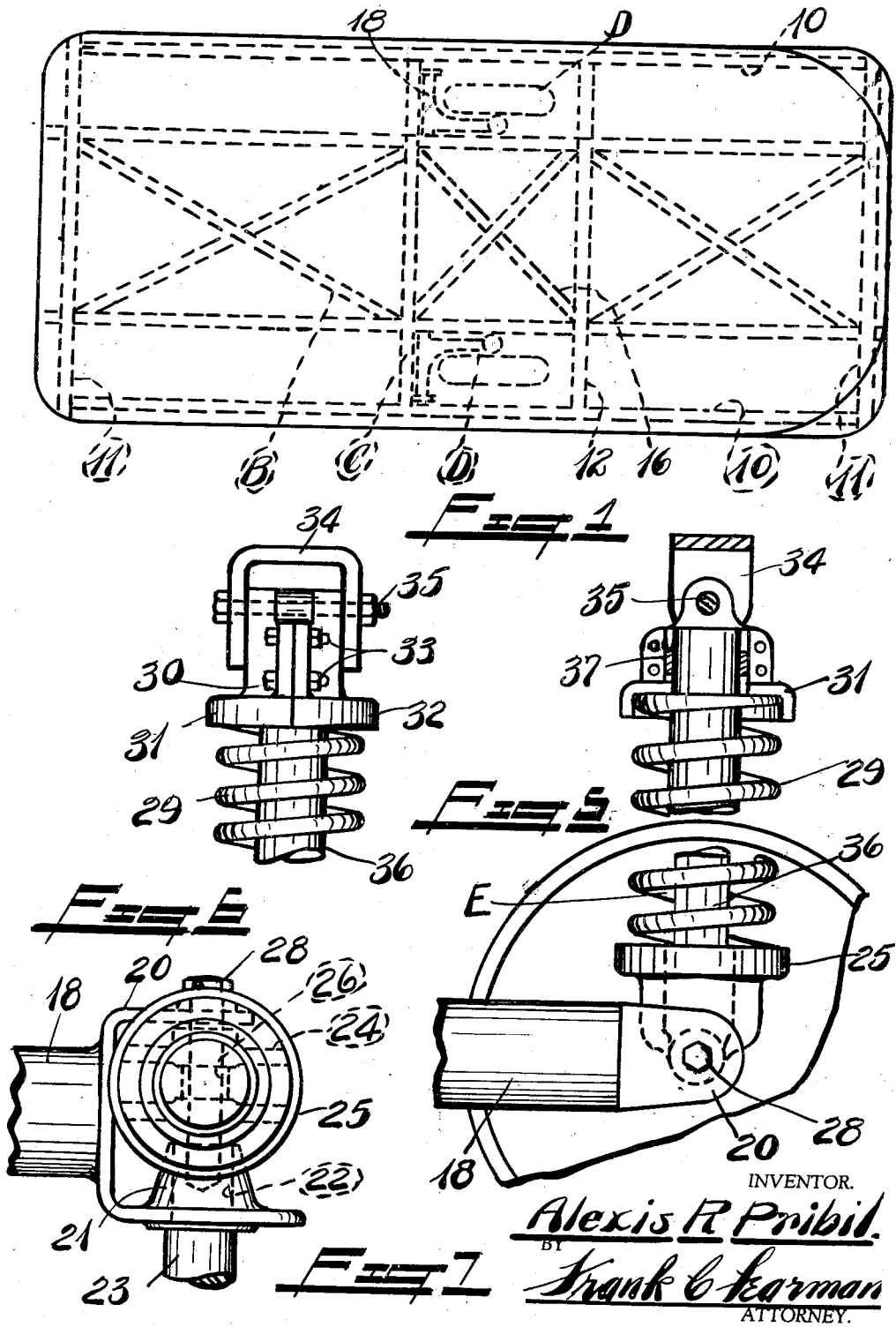

Patented May 16, 1939

2,158,488

UNITED STATES PATENT OFFICE 2,158,488

INDEPENDENTLY SPRUNG SUSPENSION WHEEL UNIT

Alexis R. Pribil, Saginaw, Mich.

Application September 19, 1936, Serial No. 101,544

6 Claims. (Cl. 280—124)

This invention relates to independently sprung suspension wheel units such as used on house trailers, baggage trailers, and similar vehicles which are attached to and drawn by a power vehicle.

One of the prime objects of the invention is to design an independently sprung suspension unit of simple and practical design, which can be readily fitted to and forms a part of the trailer chassis, and which can be easily mounted in position.

Another object is to provide an independently sprung suspension unit which eliminates the necessity of wheel housings in the trailer body, and which is provided with double action shock absorbers so that the trailer rides evenly and smoothly over rough and uneven roads without bouncing or sharp recoils.

A further object is to provide an independently sprung suspension unit which is in no manner connected to or affected by the companion wheel on the opposite side of the chassis, thus eliminating the conventional axle member, and permitting the vehicle body to be slung close to the ground, making it easy to get into or out of, and providing a construction which can be easily and quickly removed and/or replaced by unskilled labor.

A still further object is to provide a wheel unit which readily absorbs sharp road shocks and impacts, which is of practical and rugged construction, which is self-aligning, and which can be readily and economically manufactured and assembled.

The above and other objects will appear as the specification progresses, reference being had to the accompanying drawings in which I have shown the preferred embodiment of my invention and in which like reference numerals indicate like parts throughout the several views thereof.

In the drawings—

Fig. 1 is a top plan view of a trailer body showing my independently sprung suspension unit in connection therewith.

Fig. 2 is an enlarged fragmentary plan view of the suspension unit with the cover plate omitted from one of the wheel members.

Fig. 3 is an enlarged side elevational view showing one of the wheel units.

Fig. 4 is a front view thereof.

Fig. 5 is an enlarged fragmentary part sectional view illustrating the construction of the spring seat and shock absorber connection.

Fig. 6 is a fragmentary view of the spring seat and bracket.

Fig. 7 is an enlarged fragmentary plan view of the end of the draft link.

The construction of a conventional trailer chassis includes a rear axle, on which a pair of ground engaging wheels are mounted, leaf springs are mounted on this axle, and the trailer body is suspended on said springs. Such construction requires wheel housings, etc., is relatively heavy, and the clearance or the distance from the trailer floor to the ground is determined and governed by the axle clearance and size of the wheels. In my improved construction the conventional axle, leaf springs, wheel housings, etc., are eliminated, a smaller wheel can be used, and I also provide means for absorbing the recoil or rebound occasioned by rough roads or obstacles over which the vehicle travels.

Referring now more particularly to the drawings, the trailer frame includes the spaced apart, longitudinally disposed member 10 spaced in parallel relation and to which the transversely disposed members 11 are connected in any suitable manner, and the chassis includes a suitably trussed frame "B" which is connected to the independently sprung suspension unit "C" in any approved manner to form a rugged and substantial running gear.

This suspension unit is formed as clearly shown in Figs. 2, 3, and 4 of the drawings and comprises a pair of spaced apart, transversely disposed members 12 and 13 respectively, the end sections of which are secured together by means of spaced apart braces 14 which form a bridge over the wheels, transversely disposed bars 15 serving to reinforce and secure these bridge members in spaced relation, and diagonally disposed braces 16 are provided to reinforce the center section of said unit.

Spaced apart brackets 17 are mounted on the member 12 in pairs, and one end of a draft link 18 is pivotally secured thereto by means of the bolts 19, the opposite end of said link being yoke shaped as at 20, and is provided with a hub 21 adapted to receive the shank 22 of a spindle 23, said shank terminating in a bracket section 24 having the spring seat 25 formed integral therewith, this bracket section is bored as at 26 and when in assembled relation is in alignment with the opening 27 provided in the opposite arm of the yoke and a stud 28 is mounted therein, the end of the stud having threaded engagement with the spindle shank as shown.

The wheel assembly "D" is mounted on this spindle 23 in the conventional manner, and the draft link serves to pivotally connect it to the member 12 as above described.

A coil spring 29 is mounted in the spring seat 25 as clearly shown in Fig. 5 of the drawings, the upper end of said spring engaging a cup shaped member 30 which is preferably formed in two sections 31 and 32 respectively, and these sections are secured together by means of bolts 33, this member 30 is pivotally secured to a bracket 34 by means of the bolt 35, this bracket being in turn welded or bolted to the bar 15 which connects the bridge braces.

Recoil shock absorbers 36 are mounted within the coil springs 29, the upper ends being connected to the bolts 35, the lower ends being provided with an eye which engages the studs 28, a resilient collar 37 being provided in the member 30 to provide for flexibility and limited movement of the shock absorber with relation to the spring seats.

These shock absorbers can be of any desired design, either pneumatic or hydraulic, it being merely necessary to have a pivotal connection to the wheel spindle shank and the frame, and it will be obvious that as the coil springs are compressed, due to passing over uneven roadways or obstacles, that the shock absorber will absorb the recoil and thus provide smooth and easy riding qualities.

The draft links 18 are mounted on the inner side of the wheel, and I wish to direct particular attention to the fact that there are no obstructing members or braces on the outer side of the wheel, and that said wheel and/or tire can be freely and easily removed without displacement or removal of any part of the chassis or trailer body.

The bridged sections of the unit can, of course, be covered with metal sheets 38, if desired, but this is optional with the manufacturer.

From the foregoing description it will be clearly obvious that I have perfected a very simple, substantial and economical independent wheel suspension unit for use on trailers and similar drawn vehicles.

What I claim is:

1. A trailer of the class described and comprising a main frame, bridge members connected to the frame and forming wheel housings, wheel assemblies accommodated by said housings and including spindles, draft links having one end pivotally connected to the main frame and terminating in a hub adapted to receive said spindle, means for securing said hub to said spindle, shock absorbers pivotally connected to said hub securing means and to the bridge frame members, and springs surrounding said shock absorbers and interposed between said spindles and the upper sections of the wheel housings.

2. In a vehicle, a frame structure comprising a pair of wheel housings suitably connected by frame members extending therebetween, wheel assemblies associated with said housings and including projecting spindles, a draft link formed with a yoke shaped end pivotally connected to each spindle, the opposite end of each link being hingedly connected to one of said frame members, and a vertically disposed shock absorber and spring assembly pivotally connected to each wheel assembly and the upper section of the frame respectively.

3. An independent wheel suspension unit comprising a frame including horizontally spaced bridge members forming spaced wheel housings, wheel assemblies mounted in said housings and including spindles, a draft link pivotally connected to the frame and terminating in a yoke shaped section provided with a hub adapted to receive the shank of the wheel spindle, means for securing the hub to the spindle, a spring seat pivotally mounted on said securing means, resilient means interposed between each spring seat and the upper section of the frame, and a vertically disposed shock absorber also connected to each wheel assembly and to the upper section of the frame for absorbing the recoil of the springs.

4. An independent wheel suspension unit comprising a frame including horizontally spaced bridge members forming wheel housings, a wheel assembly accommodated by each housing, a draft link pivotally connected to the frame, and terminating in a yoke shaped section formed with a hub adapted to be secured to the spindle to form an extension thereof, a spring seat pivotally associated with each extension, a spring interposed between each spring seat and the upper section of each bridge member, and a shock absorber mounted in each spring and having pivotal connection with said spindle extension and with the upper section of the wheel housing.

5. A trailer vehicle comprising a body frame, an independent wheel suspension unit secured to said body frame and including wheel housings, a wheel assembly accommodated by each of said housings, draft links pivotally connected to said frame, the opposite end of each link terminating in a yoke, means for securing said yokes to the wheel spindles to form extensions thereof, shock absorbers pivotally connected to said securing means and to the wheel housings, and resilient means surrounding said shock absorbers and interposed between said wheel assemblies and the upper section of the wheel housings.

6. An independent wheel suspension unit comprising a frame including bridge members forming wheel housings, wheel assemblies accommodated by said housings, individual draft links having one end connected to the frame, the opposite end terminating in a yoke including a hub adapted to receive the shank of the wheel spindle, means for detachably securing the hub to the spindle, a spring seat bracket pivotally connected to the hub securing means, and having a spring seat formed integral therewith, a spring seat pivotally secured to the bridge members, shock absorbers extending through said spring seats and spring seat brackets and pivotally connected to the hub securing means and to the bridge members, springs surrounding said shock absorbers and interposed between the spring seats, and means providing for limited transverse movement of the shock absorbers with relation to the spring seats.

ALEXIS R. PRIBIL.